Figure 1A:
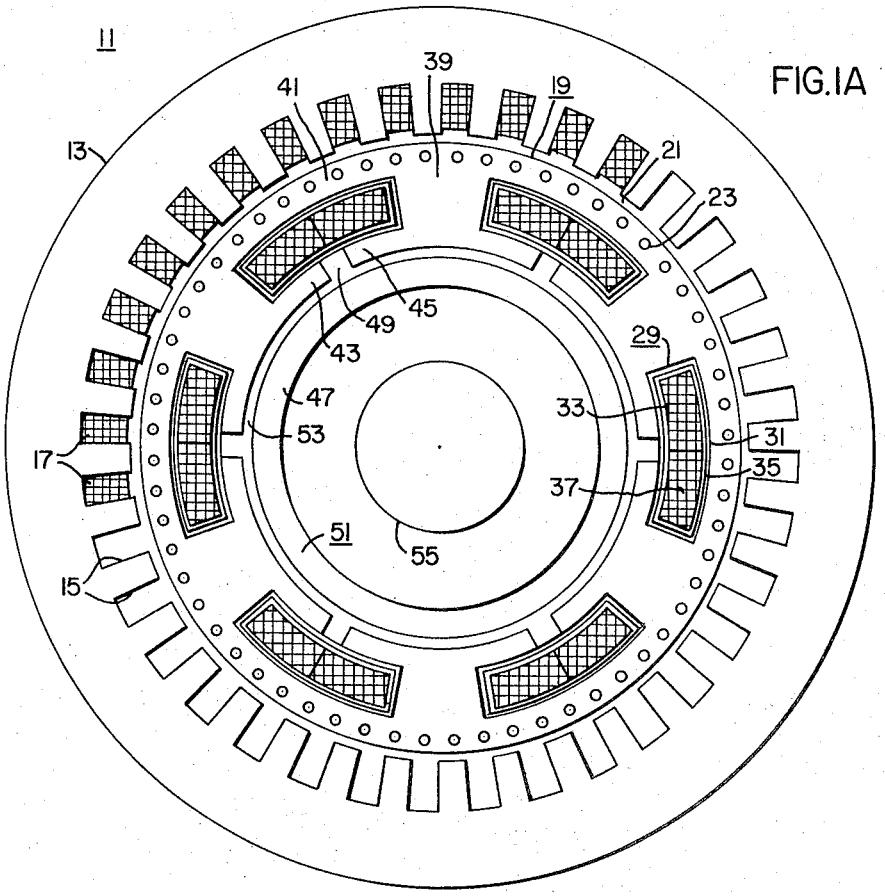
Figure 1B:
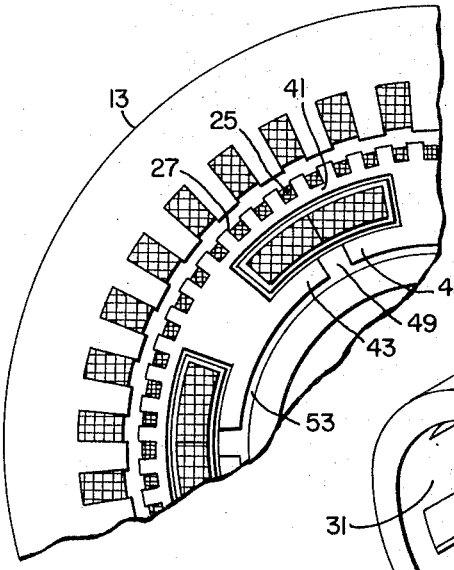
Figure 2:
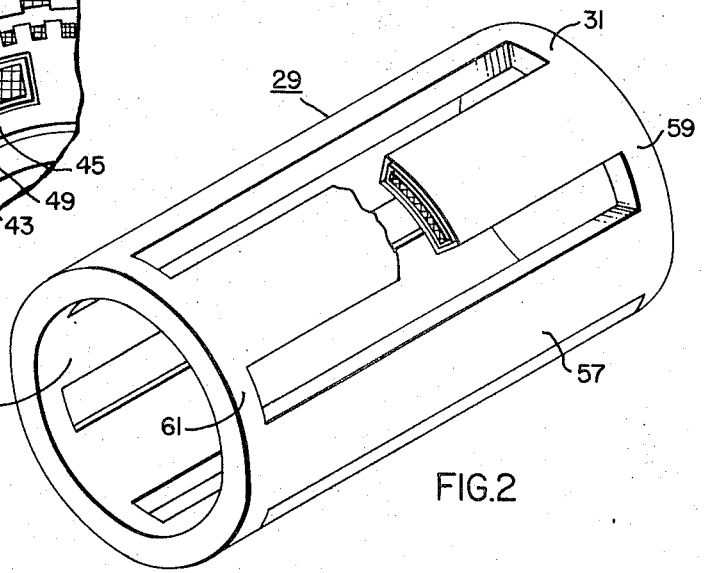

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 6, 1974

925 O.G. 8

T925,001

DYNAMOELECTRIC MACHINE WITH A SUPERCONDUCTIVE FIELD WINDING FOR OPERATION IN EITHER A SYNCHRONOUS OR AN ASYNCHRONOUS MODE

Cecil J. Mole, Monroeville, and Henry E. Haller III, Pittsburgh, Pa., assignors to Westinghouse Electric Corporation, Pittsburgh, Pa.

Filed Jan. 29, 1973, Ser. No. 327,520
**Int. Cl. H02k *9/00***
U.S. Cl. 310—52
1 Sheet Drawing. 16 Pages Specification

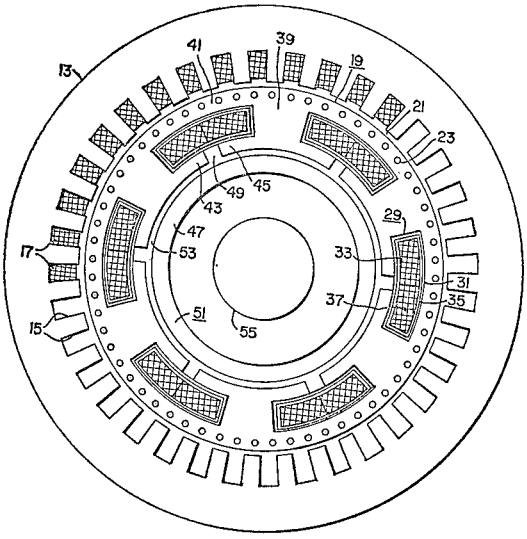

Two parallel magnetic flux paths are provided in a dynamoelectric machine having a superconductive field winding. A first, or main, magnetic flux path includes at least one area of nonferromagnetic or diamagnetic material. A second, or shunt, magnetic flux path prevents the relatively low frequency AC flux present during starting or asynchronous operation of the machine, when used as an AC motor, from penetrating the superconductive winding.

DYNAMOELECTRIC MACHINE WITH A SUPERCONDUCTIVE FIELD WINDING FOR OPERATION IN EITHER A SYNCHRONOUS OR AN ASYNCHRONOUS MODE

Filed Jan. 29, 1973